(12) United States Patent
Varisco et al.

(10) Patent No.: US 12,320,421 B2
(45) Date of Patent: Jun. 3, 2025

(54) CONTROL METHOD FOR CARRYING OUT A GEAR SHIFT IN A TRANSMISSION PROVIDED WITH A CLUTCH GEARBOX

(71) Applicant: FERRARI S.P.A., Modena (IT)

(72) Inventors: Stefano Varisco, Modena (IT); Andrea Nannini, Modena (IT); Daniele Genova, Modena (IT); Lorenzo Laraia, Modena (IT); Alessandro Barone, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 18/828,218

(22) Filed: Sep. 9, 2024

(65) Prior Publication Data
US 2025/0084922 A1    Mar. 13, 2025

(30) Foreign Application Priority Data

Sep. 11, 2023  (IT) .......................... 102023000018561

(51) Int. Cl.
*F16H 61/688*   (2006.01)
*F16H 61/04*    (2006.01)

(52) U.S. Cl.
CPC ....... *F16H 61/688* (2013.01); *F16H 61/0403* (2013.01); *F16H 2061/0422* (2013.01)

(58) Field of Classification Search
CPC ............... F16H 61/688; F16H 67/0403; F16H 2061/0422
USPC ........................................................ 701/51
See application file for complete search history.

(56) References Cited

U.S. PATENT DOCUMENTS

| 6,506,139 | B2 * | 1/2003 | Hirt ....................... | B60W 10/08 903/910 |
| 6,887,184 | B2 * | 5/2005 | Buchanan ............. | B60W 10/02 701/67 |
| 7,086,989 | B2 * | 8/2006 | Siebigteroth ......... | F16H 61/061 477/109 |
| 8,608,615 | B2 * | 12/2013 | Fuechtner ................ | F16H 3/10 74/330 |
| 9,365,204 | B2 * | 6/2016 | Whitney ............... | F02D 11/105 |

(Continued)

FOREIGN PATENT DOCUMENTS

DE    10308690 A1    10/2003
JP    2021079877 A    5/2021

OTHER PUBLICATIONS

Italian Search Report for Application No. 202300018561; Filing Date: Sep. 11, 2023; Date of Mailing: Mar. 1, 2024; 6 pages.

*Primary Examiner* — Colby M Hansen
(74) *Attorney, Agent, or Firm* — CANTOR COLBURN LLP

(57) ABSTRACT

Control method to carry out a gear shift in a manual automatic transmission provided with a gearbox having at least one clutch and in a road vehicle having an internal combustion engine and at least one reversible electric machine. The control method involves the steps of: receiving a gear shift command; opening and closing the clutch to allow the drive gear to be changed from the current gear to the following gear; determining a torque objective to be generated by the electric machine; controlling the electric machine to pursue the torque objective; and adding, only and exclusively during the gear shift, to the torque objective an additional torque profile which is impulsive and temporary and temporarily modifies the development of the torque objective.

17 Claims, 8 Drawing Sheets

(56) References Cited

U.S. PATENT DOCUMENTS

| | | | |
|---|---|---|---|
| 9,581,227 B2 * | 2/2017 | Park | F16H 37/046 |
| 10,562,512 B2 * | 2/2020 | Miller | B60W 10/188 |
| 10,604,137 B2 * | 3/2020 | Doering | B60K 6/48 |
| 11,180,149 B2 * | 11/2021 | Choi | B60W 50/082 |

* cited by examiner

CONTROL METHOD FOR CARRYING OUT A GEAR SHIFT IN A TRANSMISSION PROVIDED WITH A CLUTCH GEARBOX

CROSS-REFERENCE TO RELATED APPLICATIONS

This patent application claims priority from Italian patent application no. 102023000018561 filed on Sep. 11, 2023, the entire disclosure of which is incorporated herein by reference.

FIELD OF THE ART

The present invention relates to a control method for carrying out a gear shift in a transmission provided with a clutch gearbox.

The present invention is advantageously applied to a transmission provided with a dual-clutch gearbox, to which the following discussion will explicitly refer without losing its generality.

PRIOR ART

An automatic manual transmission (commonly referred to as "AMT") provided with a dual-clutch gearbox comprises: a pair of primary shafts that are coaxial to each other, independent of each other and inserted one inside the other; two coaxial clutches, each of which is suitable for connecting a respective primary shaft to a drive shaft of an internal combustion engine; and at least one secondary shaft that transmits motion to the drive wheels and that can be coupled to the primary shafts by means of respective pairs of gearwheels, each of which defines a gear.

During a gear shift, the current gear couples the secondary shaft to a primary shaft while the following gear couples the secondary shaft to the other primary shaft; consequently, the gear shift takes place by crossing the two clutches, i.e. by opening the clutch associated with the current gear and simultaneously closing the clutch associated with the following gear.

When the clutch associated with the following gear starts to transmit the torque to the drive wheels, the clutch associated with the current gear is progressively opened, causing the two clutches to cross; as the clutch associated with the following gear increases the torque transmitted to the drive wheels, the clutch associated with the current gear decreases the torque transmitted to the drive wheels in a complementary manner so that the transmission of the torque to the drive wheels is never interrupted.

However, the average e driver is accustomed to the sensations conveyed by a traditional single-clutch gearbox and therefore expects to perceive a "torque hole" (i.e. an "acceleration hole" or a "deceleration hole") during a gear shift followed by an increase in the drive torque (i.e. acceleration) at the end of an upshift or an increase in the braking torque (i.e. deceleration) at the end of a downshift.

In contrast, in a standard gear shift of a dual-clutch gearbox, during an upshift one only feels a progressive decrease in the longitudinal acceleration of the road vehicle due to the progressive lengthening of the gear ratio of the drive torque generated by the internal combustion engine, and during a downshift one only feels a progressive increase in the longitudinal deceleration of the road vehicle due to the progressive shortening of the gear ratio of the resistant torque (the so-called "engine brake") generated by the internal combustion engine. This gear shifting mode is excellent from a performance perspective, but causes the exact opposite feeling in most drivers, namely that it is detrimental for performance.

It is important to note that the opinion expressed by drivers must be carefully taken into account even when technically wrong, as the vast majority of drivers purchase cars (and especially high-performance sports cars that are used primarily for "fun" driving rather than to satisfy mobility needs) on the basis of their own perceptions and beliefs and not on the basis of objective criteria. In other words, the most important thing is not that the car is actually high-performing, but that the car is perceived by drivers as being high-performing and, above all, that it is perceived by drivers as funny and engaging to drive.

Patent Application JP2021079877A describes a control method for carrying out a gear shift in a transmission provided with a clutch gearbox and a rotating electric machine that is controlled to generate a torque that simulates the gear shift operation of the automatic transmission.

Patent Application DE10308690A1 describes a gear shift strategy for a dual-clutch gearbox in a car that is also provided with a rotating electric machine.

DISCLOSURE OF THE INVENTION

The aim of the present invention is to provide a control method for carrying out a gear shift in a transmission provided with a clutch gearbox, which control method allows to increase driving pleasure and whose implementation is, at the same time, simple and cost-effective.

According to the present invention, a control method is provided for carrying out a gear shift in a transmission provided with a clutch gearbox, according to what claimed in the appended claims.

The claims describe preferred embodiments of the present invention forming an integral part of the present disclosure.

BRIEF DESCRIPTION OF THE DRAWINGS

The present invention will now be described with reference to the enclosed drawings, showing some non-limiting embodiments thereof, wherein.

PREFERRED EMBODIMENTS OF THE INVENTION

Figure 1:
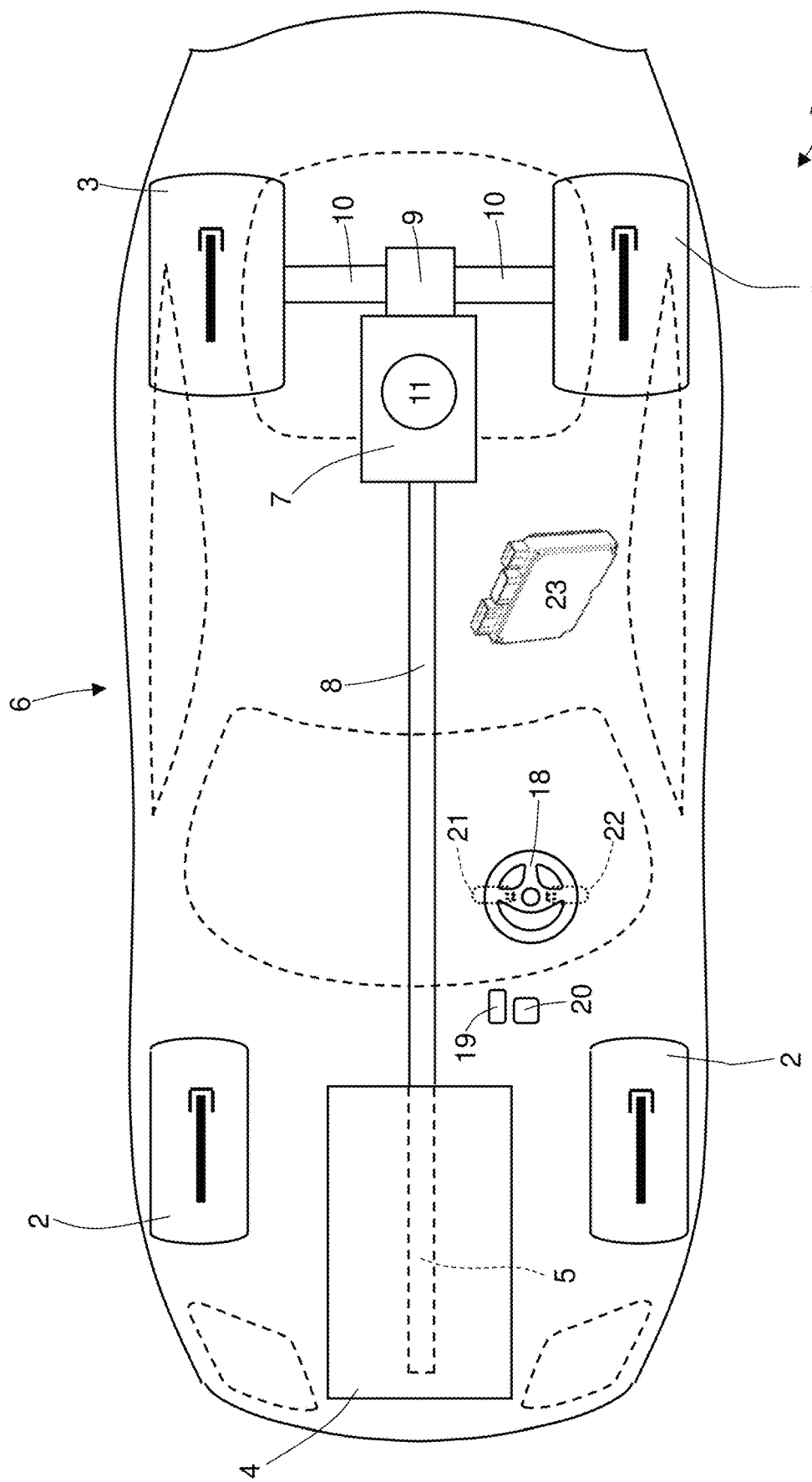
FIG. 1 is a schematic and plan view of a rear-wheel drive vehicle provided with an automatic manual transmission that is controlled according to the control method of the present invention.

In FIG. 1, number 1 globally denotes a road vehicle (specifically a car) provided with two front wheels 2 and two rear drive wheels 3.

The road vehicle 1 comprises an internal combustion engine 4, which is arranged in the front, has a drive shaft 5 and produces a drive torque $T_E$ that is transmitted to the rear drive wheels 3 via a manual automatic transmission 6. The transmission 6 comprises a dual-clutch gearbox 7 arranged at the rear and a transmission shaft 8 connecting the drive shaft 5 to an inlet of the gearbox 7. A self-locking differential 9, from which a pair of axle shafts 10 depart, each of which is integral to a rear drive wheel 3, is connected in cascade to the gearbox 7.

In addition, the road vehicle 1 comprises at least one reversible electric machine 11 (i.e. one that can work either as an electric motor by absorbing electrical energy and generating a mechanical drive torque, or as an electric generator by absorbing mechanical energy and generating electrical energy). In the embodiment shown in the accompanying Figures, the shaft of the electric machine 11 is connected to the gearbox 7, but alternatively the shaft of the electric machine 11 could be connected to the drive shaft 5 of the internal combustion engine 4, to the rear wheels 3 or to the front wheels 2 (which then become potentially drive wheels).

The electric machine 11 is controlled by a corresponding AC/DC power electronic converter (i.e. an "inverter") that is connected to an electrical energy storage system provided with chemical batteries; i.e. the DC-AC power electronic converter is bidirectional and comprises a direct current side that is connected to the electrical energy storage system and a three-phase alternating side that is connected to the electric machine 11.

Figure 2:
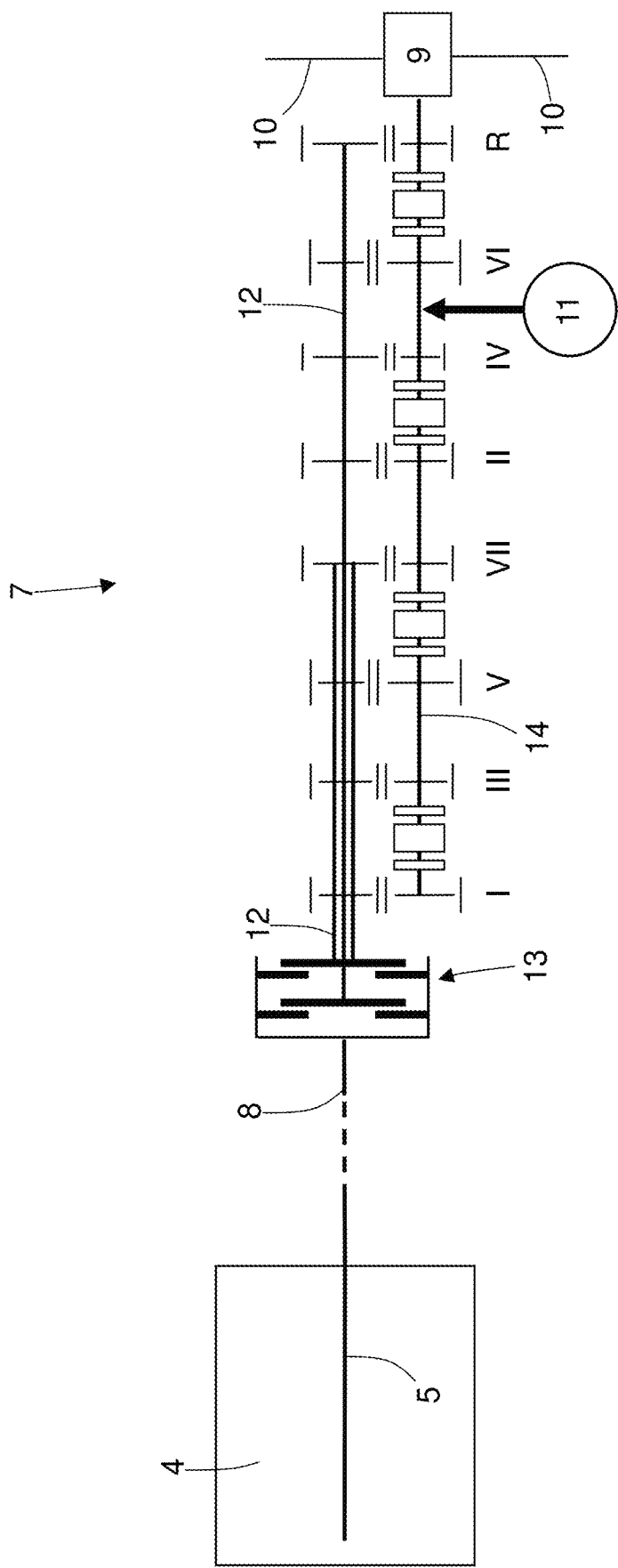
FIG. 2 is a schematic view of the automatic manual transmission of FIG. 1 provided with a dual-clutch gearbox.

As shown in FIG. 2, the dual-clutch gearbox 7 comprises a pair of primary shafts 12 that are coaxial to each other, independent and inserted one inside the other. In addition, the dual-clutch gearbox 7 comprises two coaxial clutches 13, each of which is adapted to connect a respective primary shaft 12 to the drive shaft 5 of the internal combustion engine 4 through the interposition of the transmission shaft 8. According to an alternative embodiment, each clutch 13 is in an oil bath and is therefore commanded under pressure (i.e. the degree to which the clutch 13 opens/closes is determined by the pressure of the oil within the clutch 13); according to an alternative embodiment, each clutch 13 is dry and is therefore commanded in position (i.e. the degree to which the clutch 13 opens/closes is determined by the position of a movable element of the clutch 13).

The dual-clutch gearbox 7 comprises a single secondary shaft 14 connected to the differential 9 that transmits motion to the rear wheels 3; according to an alternative and equivalent embodiment, the dual-clutch gearbox 7 comprises two secondary shafts 14 both connected to the differential 9. In the embodiment shown in the enclosed figures, the shaft of the electric machine 11 is connected to the secondary shaft 14 of the gearbox 7.

As shown in FIG. 1, the vehicle 1 comprises a cockpit, within which a driving position is formed with a steering wheel 18, an accelerator pedal 19 and a brake pedal 20. The driver's place also comprises an upshift command 21 and a downshift command 22, which, as will be explained later, can be used by the driver to select a gear (generally in the case of performance driving on a circuit). Preferably, the commands 21 and 22 comprise two paddles that are connected to the steering wheel 18 and are arranged behind the rim of the steering wheel 18 to be activated without taking the hands off the steering wheel 18.

The road vehicle 1 comprises a control unit 23 that, among other things, oversees the operation of the internal combustion engine 4, the dual-clutch gearbox 7, and the electric machine 11.

In use, i.e. while the vehicle 1 is running, the control unit 23 detects a position of the accelerator pedal 19 and a position of the brake pedal 20 to determine the driver's wishes about the gear modes. In addition, the control unit 23 detects an actuation of the upshift command 21 and an actuation of the downshift command 22 to determine the selected gear; that is, the selected gear is decided according to the actions on the upshift command 21 and downshift command 22.

Furthermore, in use, the control unit 23 determines a torque objective $T_E$ to be generated by the internal combustion engine 4 and a torque objective $T_M$ to be generated by the electric machine 11 depending on the position of the accelerator pedal 7 and depending on the selected gear; it is important to note that the torque objective IM can be positive (by operating the electric machine 11 as an engine) or it can be negative (by operating the electric machine 11 as a generator). In general, the torque objective $T_M$ is positive when the accelerator pedal 7 is at least partially pressed and is negative when the accelerator pedal 7 is released.

In other words, the control unit 23 drives the internal combustion engine 4 to pursue the torque objective $T_E$ and drives the electric machine 11 to pursue the torque objective $T_M$.

The modes of performing a gear shift from the current gear A to the following gear B when the driver acts on the upshift command 21 or downshift command 22 is described hereinafter.

In an initial situation (i.e. before the gear shift), a clutch 13A is closed to transmit motion to a primary shaft 12A, which in turn transmits motion to the secondary shaft 14 via the current gear A that is engaged; a clutch 13B, on the other hand, is open and thus isolates a primary shaft 12B from the transmission shaft 8. Before starting the upshift, the following gear B is engaged to connect through the gear B the primary shaft 12B to the secondary shaft 14. When the driver sends the gear-shift command via the commands 21 and 22, the gear shift is performed by opening the clutch 13A to disconnect the primary shaft 12A (thus the gear A) from the transmission shaft 8 (i.e., from the drive shaft 5 of the internal combustion engine 4) and simultaneously closing the clutch 13B to connect the primary shaft 12B (thus the gear B) to the transmission shaft 8 (i.e. to the drive shaft 5 of the internal combustion engine 4).

Figure 3:
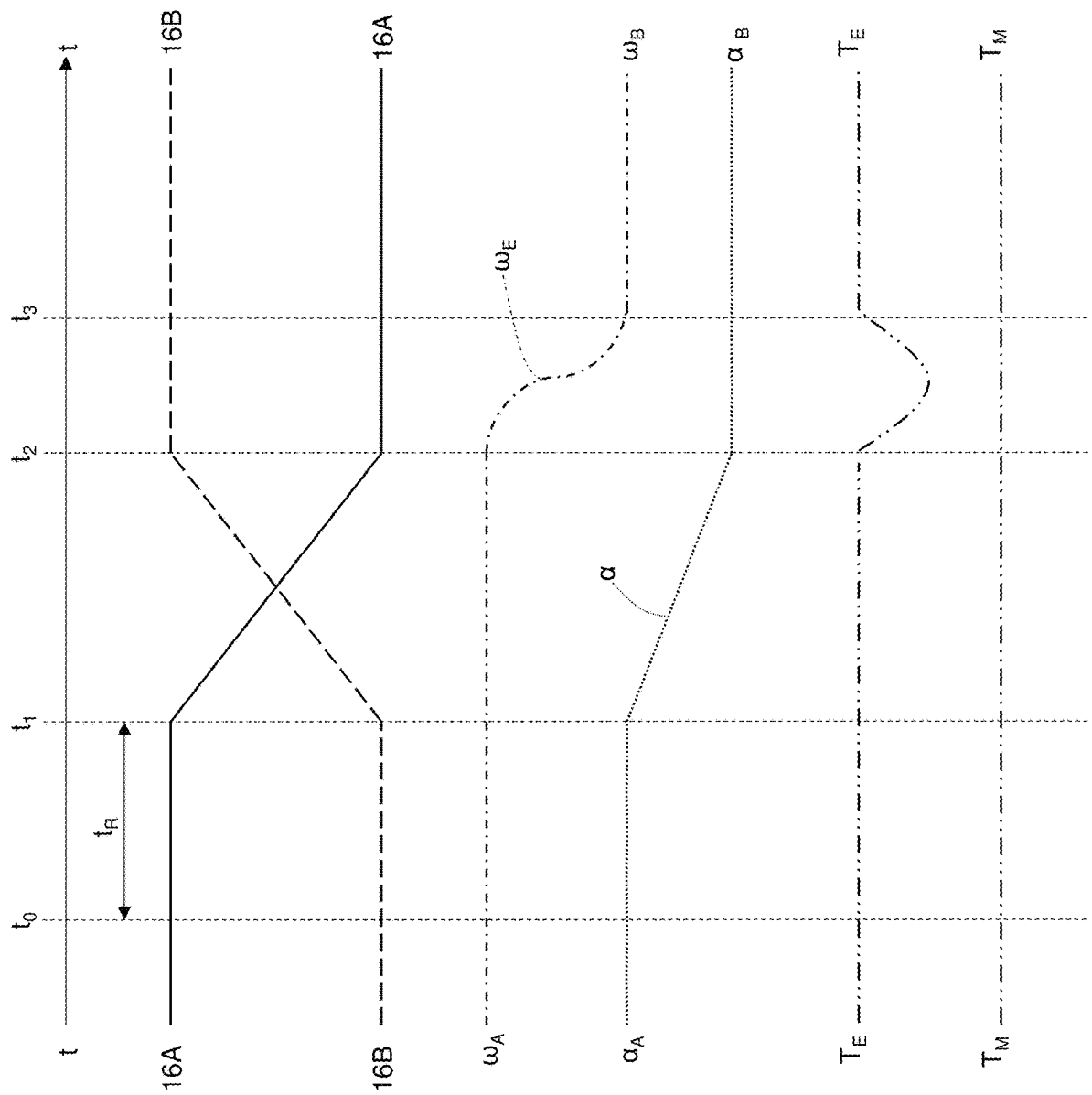
FIG. 3 shows the time evolution during an upshift and conventional gear shift of the torques transmitted by the two clutches of the dual-clutch gearbox, the rotation speed of an engine drive shaft, the longitudinal acceleration of the vehicle, a torque objective of an internal combustion engine, and a torque objective of an electric machine.

FIG. 3 shows the modes of an upshift and conventional gear shift, wherein at instant to the driver sends the gear-shift command (by acting on the upshift command 21). As soon as the control unit 23 receives the gear-shift command from the driver (instant to), the control unit 23 immediately starts closing the clutch 13B associated with the following gear B; however, before the clutch 13B associated with the following gear B can start to transmit the torque to the rear drive wheels 3 it is necessary to wait a certain filling time interval $t_R$ during which the filling of the oil inside the clutch 13B is completed.

From the instant to in which the control unit 23 immediately starts to close the clutch 13B to the instant $t_1$ in which, after the filling time $t_R$ has elapsed, the clutch 13B is filled with oil and is ready to start transmitting the torque, nothing happens to the dynamics of the road vehicle 1, i.e. all of the driving torque $T_E$ generated by the internal combustion engine 4 is transmitted entirely by the clutch 13A as it was before the start of the gear shift. At instant $t_1$ the opening of the clutch 13A is commanded; it is important to note that the opening of the clutch 13A associated with the current gear A occurs without any delay, as the clutch 13A is already full of oil under pressure and only has to be emptied of some of the oil at this step.

Between instants $t_1$ and $t_2$ the torque transfer between the two clutches 13 takes place, i.e. the torque transmitted by the clutch 13A progressively falls and at the same time the torque transmitted by the clutch 13B progressively rises, resulting in a crossover between the two clutches 13. Preferably (but not compulsorily), the clutch 13A is opened at the same time as the clutch 13B is fully closed so that a symmetrical crossover is obtained, which allows the overall torque transmitted to the rear drive wheels 3 (and thus the torque generated by the internal combustion engine 4) to remain constant. At instant $t_2$, the clutch 13A is fully open (thus no longer transmitting the torque) while the clutch 13B is fully closed (thus transmitting all the drive torque).

The longitudinal acceleration α of the vehicle 1 is in first approximation constant and equal to the value $\alpha_A$ immediately before the gear shift, it decreases progressively towards the value $\alpha_B$ during the gear shift, and is in first approximation constant and equal to the value immediately after the gear shift. The decrease in the longitudinal acceleration α of the vehicle 1 during the gear shift is due to the fact that the drive torque $T_E$ generated by the internal combustion engine 4, which remains essentially constant, is transmitted with a progressively decreasing gear ratio (gear A is shorter than gear B) and thus a progressively decreasing drive torque is applied to the rear drive wheels 3.

The rotation speed $\omega_E$ of the drive shaft 5 of the internal combustion engine 4 is equal to the rotation speed $\omega_A$ imposed by the gear ratio of the current gear A before the gear shift, it decreases progressively towards the rotation speed WB imposed by the gear ratio of the following gear B during the gear shift, and is equal to the rotation speed $\omega_B$ after the gear shift. As shown in FIG. 3, up to the instant $t_2$ wherein the clutch 13A is fully open the rotation speed $\omega_E$ of the drive shaft 5 is kept constant and equal to the rotation speed $\omega_A$, and then is only decreased after the clutch 13A is fully open; this mode of controlling the rotation speed $\omega_E$ of the drive shaft 5 is intended to prevent the clutch 13A from becoming braking, i.e. generating a braking torque at the rear drive wheels 3.

In order to decrease the rotation speed $\omega_E$ of the shaft 5 of the internal combustion engine 4 after the complete opening of the clutch 13A, the control unit of the internal combustion engine 4, upon indication of the control unit 23, temporarily decreases the drive torque $T_E$ generated by the internal combustion engine 4 while keeping the torque transmitted by the clutch 13B constant; as a result, a difference is created between the drive torque $T_E$ generated by the internal combustion engine 4 and the torque transmitted by the clutch 13B (which is higher than the drive torque $T_E$ generated by the internal combustion engine 4), and this difference has the effect of decreasing the rotation speed $\omega_E$ of the engine shaft 5 which passes from the initial value $\omega_A$ imposed by the gear ratio of the current gear A to the final value $\omega_B$ imposed by the gear ratio of the following gear B. In other words, for a short time the rear drive wheels 3 receive both the mechanical energy generated by the internal combustion engine 4 and part of the kinetic energy possessed by the drive shaft 5 which slows down as a result. It is important to note that the temporary decrease in the drive torque $T_E$ generated by the internal combustion engine 4 has no effect on the longitudinal acceleration α of the vehicle 1, as the torque transmitted by the clutch 13B to the rear drive wheels 3 remains constant.

Throughout the gear shift, the electric machine 11 always delivers the same torque, which therefore always remains constant (either a positive value, a null value or a negative value). In other words, the electric machine 11 does not participate in any way in the operations that are carried out for gear shifting and therefore does not change its behaviour in any way during gear shifting.

Figure 4:
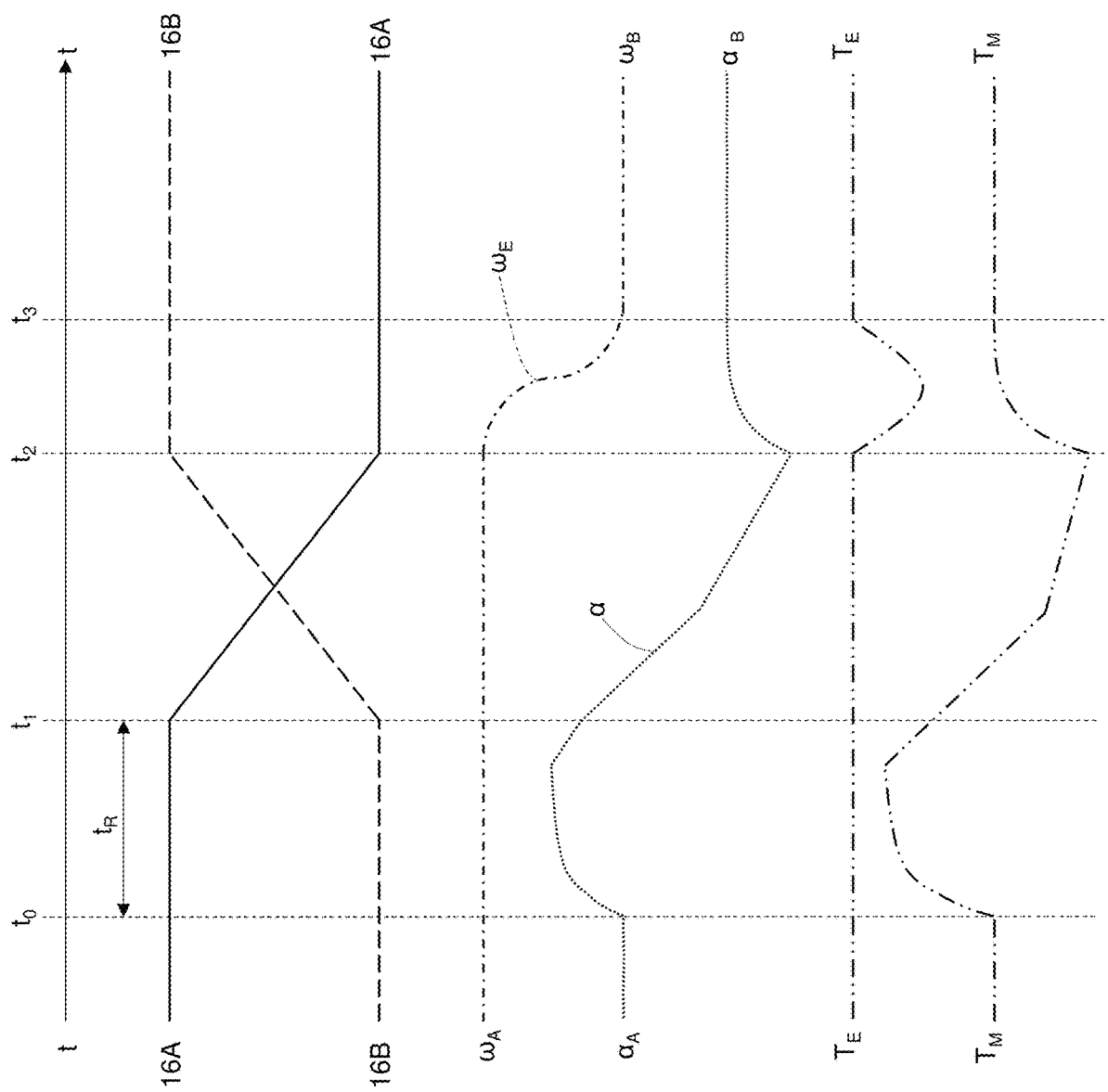
FIG. 4 shows the time evolution during an upshift and innovative gear shift of the torques transmitted by the two clutches of the dual-clutch gearbox, the rotation speed of an engine drive shaft, the longitudinal acceleration of the vehicle, a torque objective of an internal combustion engine, and a torque objective of an electric machine.

FIG. 4 shows the modes of an upshift and innovative gear shift, wherein at instant to the driver sends the gear-shift command (by acting on the upshift command 21).

The upshift and innovative gear shift shown in FIG. 4 is, in terms of controlling the position of the clutches 13A and 13B and the control of the internal combustion engine 4 (i.e. the generation of the drive torque $T_E$), entirely similarly to the upshift and conventional gear shift shown in FIG. 3 and described above. On the other hand, during the upshift and innovative gear shift shown in FIG. 4, the electric machine 11 is controlled differently and becomes an important player in the gear shift. During gear shifting, the control unit 23 adds an additional torque profile $T_{add}$ (shown in FIG. 7) to the torque objective IM of the electric machine 11 which is impulsive and temporary and temporarily changes the development of the torque objective $T_M$. In other words, when at instant to the driver selects a higher gear (as shown in FIG. 4), the control unit 23 adds the additional torque profile $T_{add}$ to the torque objective $T_M$ which temporarily modifies the torque objective $T_M$; in other words, throughout the duration of the additional torque profile $T_{add}$ (which starts at instant to and ends at instant $t_3$), the torque objective $T_M$ is modified to become a modified torque objective $T_M$.

Figure 5:
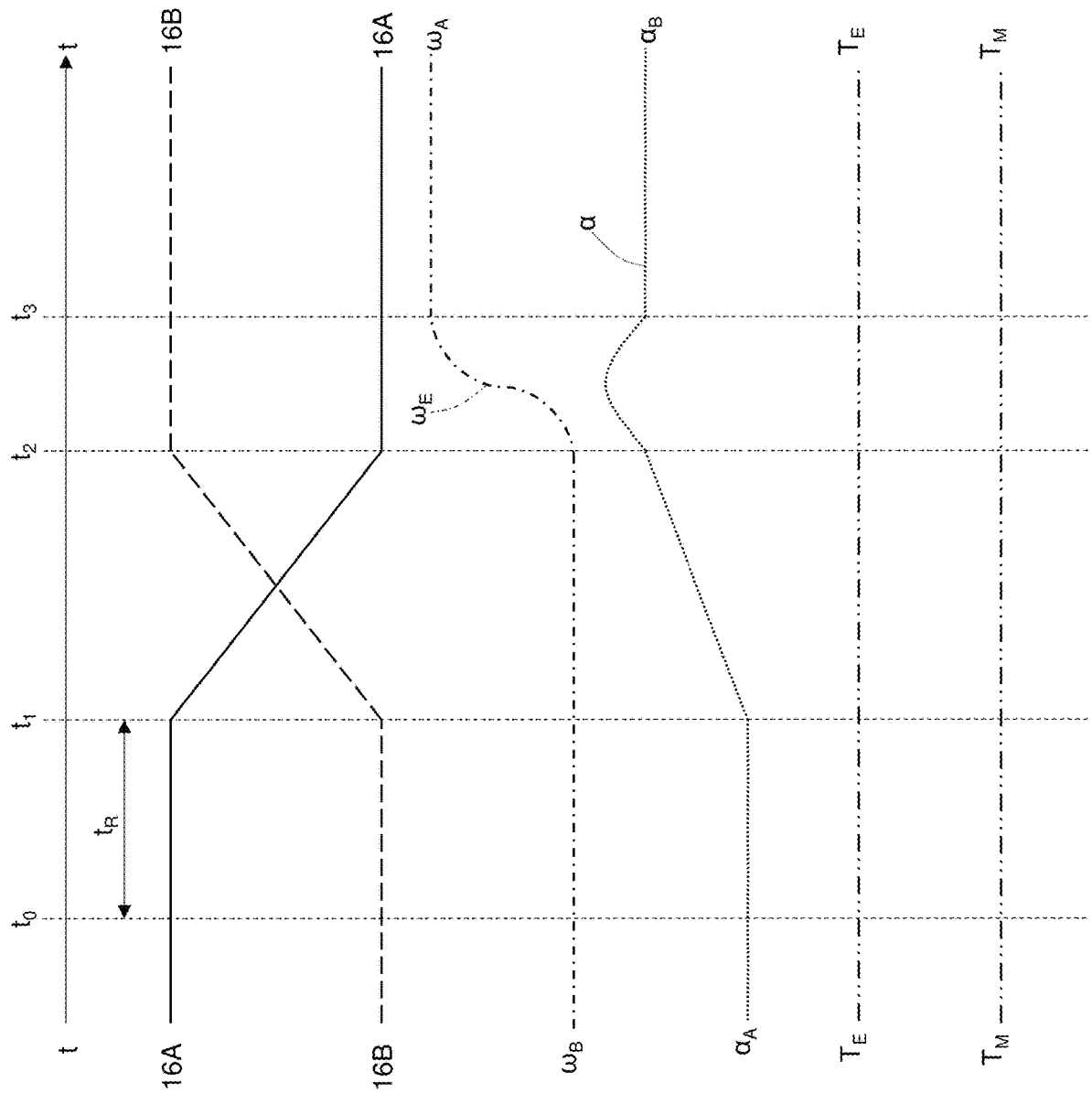
FIG. 5 shows the time evolution during a downshift and conventional gear shift of the torques transmitted by the two clutches of the dual-clutch gearbox, the rotation speed of an engine drive shaft, the longitudinal acceleration of the vehicle, a torque objective of an internal combustion engine, and a torque objective of an electric machine.

FIG. 5 shows the modes of a downshift and conventional gear shift, wherein at instant $t_0$ the driver sends the gear-shift command (acting on the downshift command 22); the downshift and conventional gear shift shown in FIG. 5 is entirely similar to the upshift and conventional gear shift shown in FIG. 3 and described above, with the difference that the longitudinal deceleration α of the vehicle 1 (i.e. the longitudinal acceleration α of the vehicle 1 having a negative value) progressively rises (in absolute value) from a lower initial value $\alpha_A$ (in absolute value) towards a higher final value $\alpha_B$ (in absolute value). The increase (in absolute value) in the longitudinal deceleration α of the vehicle 1 during the gear shift is due to the fact that the braking torque $T_E$ (i.e. the engine brake which results in a negative drive torque $T_E$) due to the internal combustion engine 4 remaining essentially constant is transmitted with a progressively increasing gear ratio (gear A is longer than gear B) and thus a progressively increasing braking torque (in absolute value) is applied to the rear drive wheels 3.

The rotation speed $\omega_E$ of the drive shaft 5 of the internal combustion engine 4 is equal to the rotation speed $\omega_A$ imposed by the gear ratio of the current gear A before the gear shift, it rises progressively towards the rotation speed $\omega_B$ imposed by the gear ratio of the following gear B during the gear shift, and is equal to the rotation speed $\omega_B$ after the gear shift. As shown in FIG. 5, up to the instant $t_2$ when the clutch 13A is fully open, the rotation speed $\omega_E$ of the drive shaft 5 is kept constant and equal to the rotation speed $\omega_A$ and then is only increased after the clutch 13A is fully open.

Throughout the gear shift, the electric machine 11 always delivers the same torque, which therefore always remains constant (either a positive value, a null value or a negative value). In other words, the electric machine 11 does not participate in any way in the operations that are carried out for gear shifting and therefore does not change its behaviour in any way during gear shifting.

Figure 6:
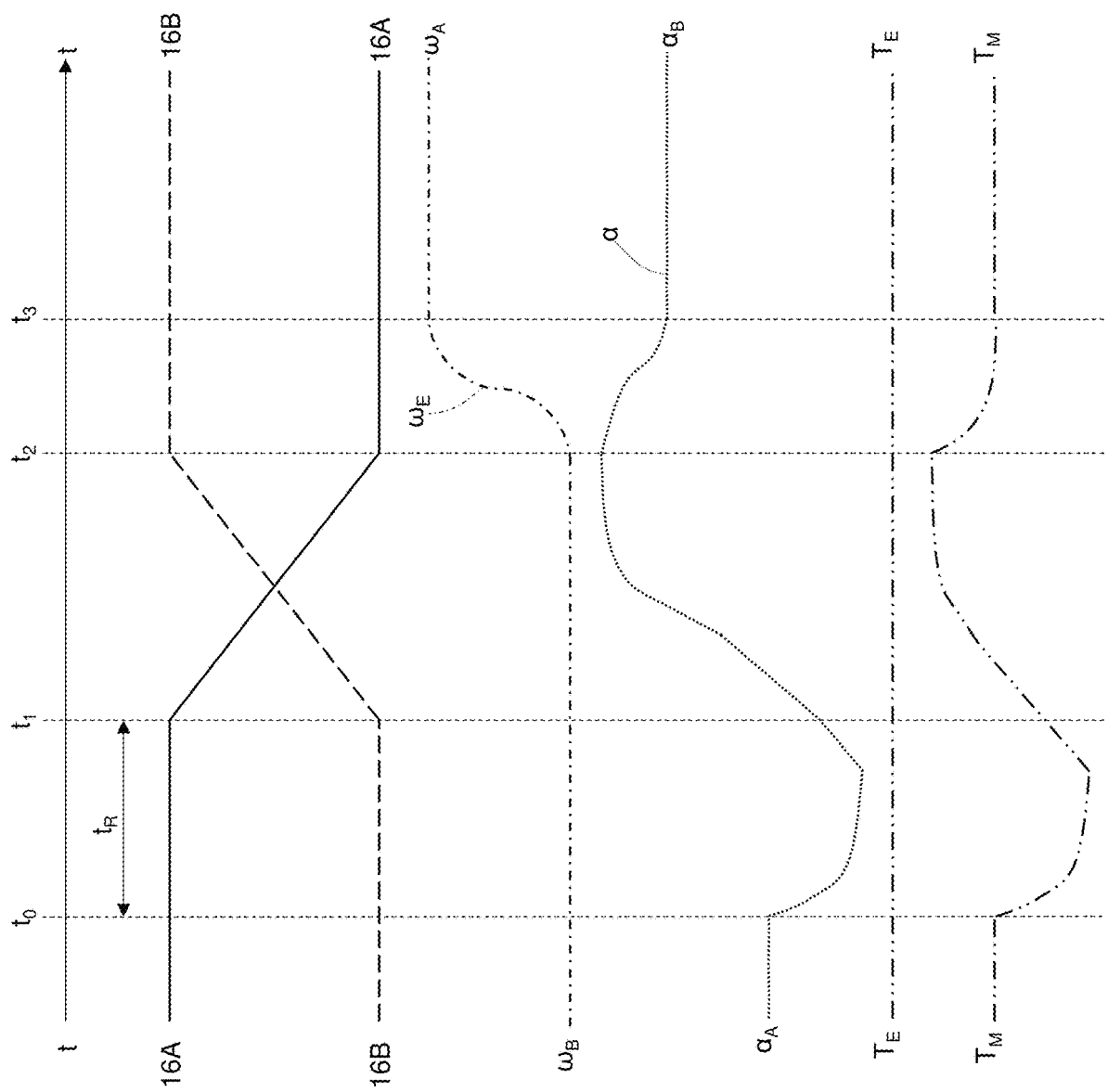
FIG. 6 shows the time evolution during a downshift and innovative gear shift of the torques transmitted by the two clutches of the dual-clutch gearbox, the rotation speed of an engine drive shaft, the longitudinal acceleration of the vehicle, a torque objective of an internal combustion engine, and a torque objective of an electric machine.

FIG. 6 shows the modes of a downshift and innovative gear shift, wherein at instant to the driver sends the gear-shift command (by acting on the downshift command 22).

The downshift and innovative gear shift shown in FIG. 6 is, in terms of controlling the position of the clutches 13A and 13B and the control of the internal combustion engine 4 (i.e. the generation of drive torque $T_E$), entirely similar to the downshift and conventional gear shift shown in FIG. 5 and described above. On the other hand, during the downshift and innovative gear shift shown in FIG. 6, the electric machine 11 is controlled differently and becomes an important player in the gear shift. During gear shifting, the control unit 23 adds an additional torque profile $T_{add}$ (shown in FIG. 8) to the torque objective $T_M$ of the electric machine 11 which is impulsive and temporary and temporarily changes the development of the torque objective $T_M$. In other words, when at instant to the driver selects a lower gear (as shown in FIG. 6), the control unit 23 adds the additional torque profile $T_{add}$ to the torque objective $T_M$, which temporarily modifies the torque objective $T_M$; in other words, throughout the duration of the additional torque profile $T_{add}$ (starting at instant $t_1$ and ending at instant $t_3$), the torque objective Ty is modified to become a modified torque objective $T_{M'}$.

Summarising the above, in use, the control unit 23 adds, at each variation in the selected gear, an additional torque profile $T_{add}$ (shown in FIGS. 7 and 8) to the torque objective $T_M$ of the electric machine 11, which is impulsive and temporary and temporarily modifies the development of the torque objective.

Figure 7:
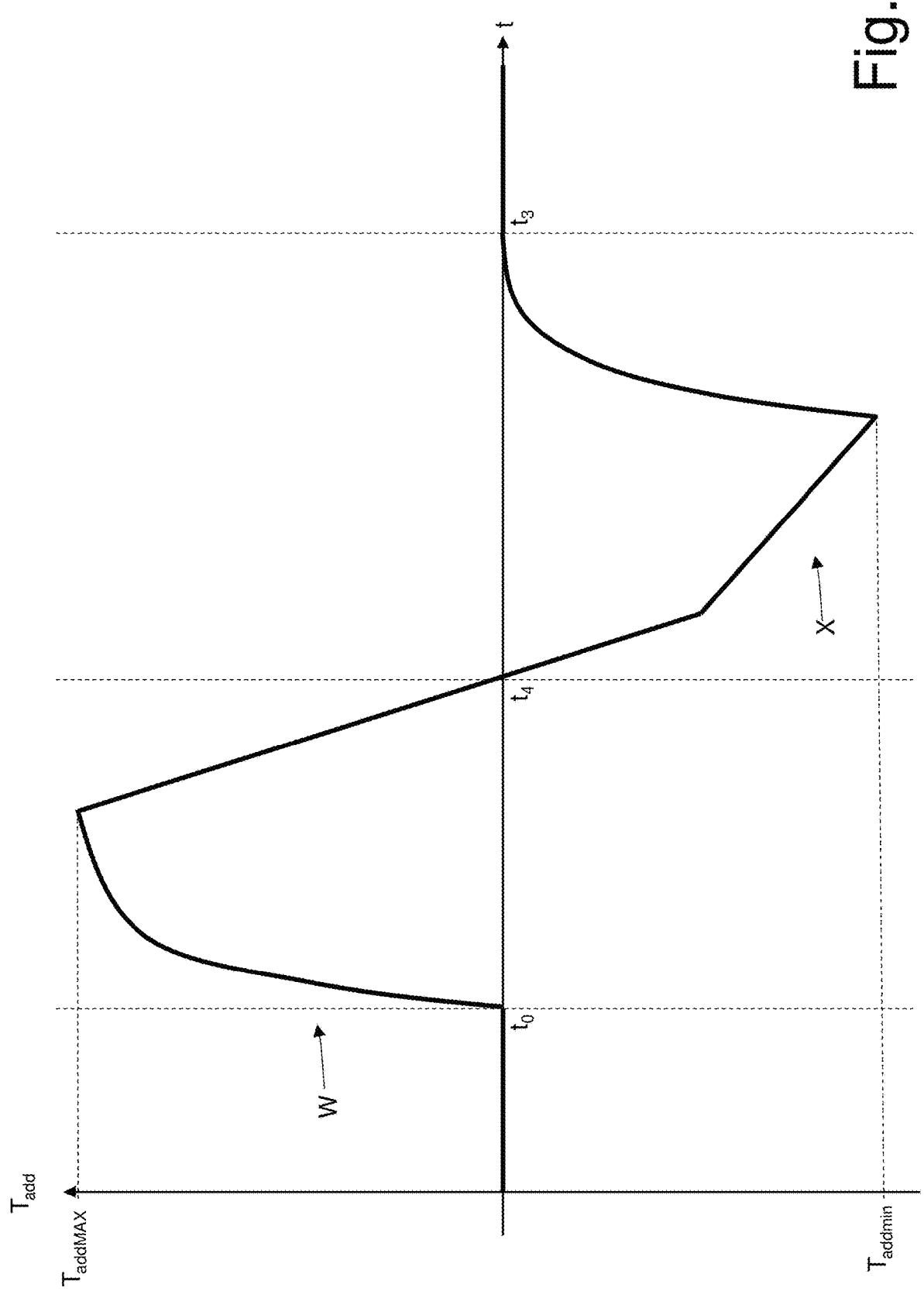
FIG. 7 is a graph showing on an enlarged scale the time evolution of an additional torque profile of FIG. 4.
Figure 8:
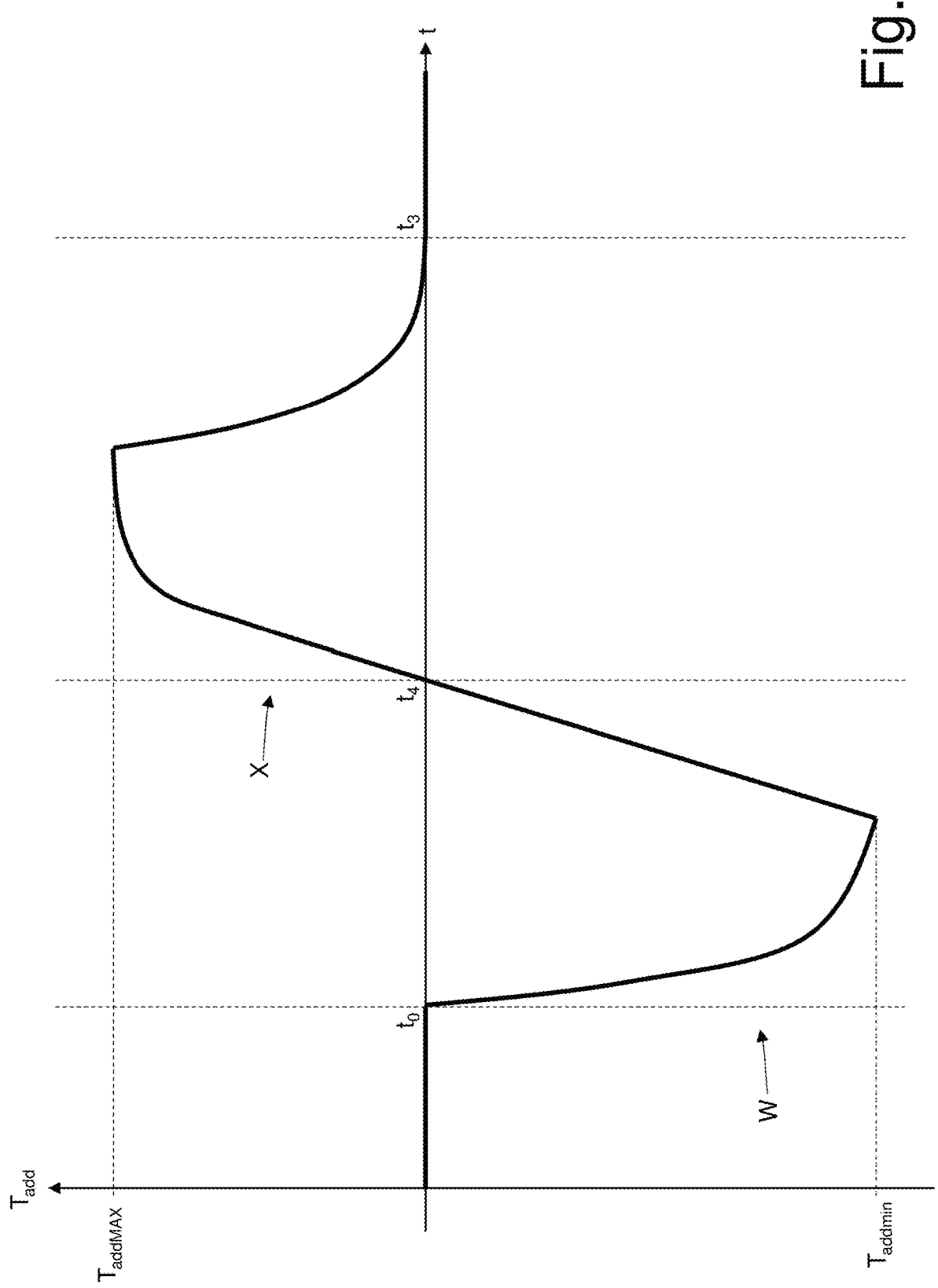
FIG. 8 is a graph showing on an enlarged scale the time evolution of an additional torque profile of FIG. 6.

In other words, as shown in FIGS. 7 and 8, when at instant to, the driver selects a higher gear (as shown in FIGS. 4 and 7) or a lower gear (as shown in FIGS. 6 and 8), the control unit 23 adds the additional torque profile $T_{add}$ to the torque objective $T_M$ of the electric machine 11 which temporarily modifies the torque objective $T_M$; i.e. throughout the duration of the additional torque profile $T_{add}$ (starting at instant to and ending at instant $t_3$), the torque objective $T_M$ is modified to become a modified torque objective $T_{M'}$.

As best shown in FIGS. 7 and 8, the additional torque profile Tada comprises a start segment W having a first sign and an end segment X that immediately follows the start segment W and has a second sign opposite to the first sign; i.e., the additional torque profile $T_{add}$ involves alternating a torque increase/decrease with a subsequent torque decrease/increase.

Preferably, each segment W or X entails a torque increase, in absolute value, from zero to a maximum value $T_{addMAX}$ or $T_{addmin}$ and a following torque decrease from the maximum value $T_{addMAX}$ or $T_{addmin}$ to zero.

Preferably, each segment W or X comprises at least one linear variation over time and at least one exponential variation over time.

According to what shown in FIG. 7, if the gear shift is up, the start segment W entails an always positive torque and the end segment X entails an always negative torque. In particular, the start segment W entails an exponential torque increase from zero (at instant to) to a maximum positive value $T_{addMAX}$ immediately followed by a linear decrease in torque from the maximum positive value $T_{addMAX}$ to zero (at instant $t_4$); on the other hand, the end segment X provides a linear torque decrease from zero (at instant $t_4$) to a minimum negative value $T_{addmin}$ immediately followed by an exponential increase from the minimum negative value $T_{addmin}$ to zero (at instant $t_3$).

According to the preferred (but non-binding) embodiment shown in FIG. 7, the linear torque decrease from zero (at instant $t_4$) to the minimum negative value $T_{addmin}$ entails a higher initial slope followed by a lower final slope; i.e. the decrease is always linear but with a differentiated decrease speed (slope, first derivative in time): initially faster and subsequently slower.

According to what shown in FIG. 8, if the gear shift is down, the start segment W entails an always negative torque and the end segment X entails an always positive torque. In particular, the start segment W entails an exponential torque decrease from zero (at instant to) to a negative minimum value $T_{addmin}$ immediately followed by a linear torque increase from the negative minimum value $T_{addmin}$ to zero (at instant $t_4$); on the other hand, the end segment X entails a toque increase from zero (at instant $t_4$) to a positive maximum value $T_{addMAX}$ value immediately followed by an exponential decrease from the positive maximum value $T_{addMAX}$ to zero (at instant $t_3$).

According to the preferred (but not binding) embodiment shown in FIG. 8, the linear torque increase from zero (at instant $t_4$) to the maximum positive value $T_{addMAX}$ entails a linear increase immediately followed by an exponential increase.

According to a possible embodiment, the maximum value $T_{addMAX}$ and the minimum value $T_{addmin}$ are constant in absolute value. According to a different embodiment, the maximum value $T_{addMAX}$ and the minimum value $T_{addmin}$ are, in absolute value, variable, e.g. as a function of the absolute value of the drive torque objective $T_M$; i.e., the maximum value $T_{addMAX}$ and the minimum value $T_{addmin}$ are in absolute value parametrised to the absolute value of the drive torque objective $T_M$.

According to a possible embodiment and as shown in FIG. 7, in the case of upshifting, the maximum value $T_{addMAX}$ is, in absolute value, greater than the minimum value $T_{addmin}$.

According to a possible embodiment and as shown in FIG. 8, in the case of downshifting, the maximum value $T_{addMAX}$ is, in absolute value, smaller than the minimum value $T_{addmin}$.

According to a possible embodiment and as shown in FIGS. 4 and 6, the additional torque profile $T_{add}$ starts at instant to and ends at instant $t_3$.

According to a possible embodiment and as shown in FIGS. 4 and 6, an absolute maximum (corresponding to the maximum value $T_{addMAX}$) of the additional torque profile $T_{add}$ during the start segment W is reached between instant to and instant $t_1$ (i.e. after instant to and before instant $t_1$).

According to a possible embodiment and as shown in FIGS. 4 and 6, 17 an absolute maximum (corresponding to the minimum value $T_{addmin}$) of the additional torque profile $T_{add}$ during the end segment X is reached at instant $t_2$ (i.e. exactly coinciding with instant $t_2$).

According to a possible embodiment and as shown in FIGS. 4 and 6, the start segment W ends, and then the end segment X starts between instant $t_1$ and instant $t_2$ (i.e. after instant $t_1$ and before instant $t_2$). In the preferred embodiment shown in the appended Figures, the automatic manual transmission 6 comprises a dual-clutch gearbox 7; according to a different embodiment not shown, the automatic manual transmission 6 comprises a single-clutch gearbox 7. In any case, in order to change the drive gear from a current gear A to a subsequent gear B, at least one clutch 13 must be opened and closed, and during the gear shift, an additional torque profile $T_{add}$ is added to the torque objective $T_M$ of the electric machine 11 which is impulsive and temporary and temporarily modifies the development of the torque objective $T_M$.

The embodiments described herein can be combined with each other without departing from the scope of protection of the present invention.

The control method described above has many advantages.

First and foremost, the control method described above increases the driving pleasure, by virtue of the fact that the jerk given by the gear shift typical of a conventional car provided with an internal combustion engine and a single-clutch gearbox is obtained. In other words, the control method described above makes it possible to simulate the sporting effect of accelerometric variations typical of a single-clutch gearbox in a very realistic and engaging manner; furthermore, the control method described above makes it possible to create innovative accelerometric variations that cannot be physically achieved by a clutch gearbox, providing the driver with new and potentially very rewarding driving sensations.

In other words, if during an up/down gear shift one only feels a more or less progressive decrease/increase in the longitudinal acceleration/deceleration of the vehicle 1 the sensation transmitted to the driver is flat and little involving as it is associated with modest performance (as it reminds of the sensations transmitted by an automatic transmission which is considered, rightly or wrongly, as extremely little sporty and performing); on the other hand, by creating, thanks to the addition of the additional torque profile $T_{add}$ to the torque objective $T_M$ generated by the electric machine 11, an impulsive and clearly perceptible variation in the drive torque applied to the drive wheels when gearshifting, it is possible to transmit very pleasant and involving sensations to the driver.

Finally, the control method described above is simple and cost-effective to implement, as it does not require the addition of any physical components and can be completely software-implemented by exploiting the architectures already existing on board road vehicles 1. It is important to note that the method described above does not consume either a high computing capacity or a large amount of memory, and therefore its implementation is possible in a known control unit with no need for upgrades or enhancements.

LIST OF REFERENCE NUMBERS OF THE FIGS

1 road vehicle
2 front wheels
3 rear wheels
4 internal combustion engine
5 drive shaft
6 transmission
7 gearbox
8 transmission shaft
9 differential
10 axle shafts
11 electric machine
12 primary shafts
13 clutches
14 secondary shaft
15 primary gearwheel
16 secondary gearwheel
17 synchronisers
18 steering wheel
19 accelerator pedal
20 brake pedal
21 upshift command
22 downshift command
23 control unit
$\omega_e$ rotation speed
$\omega_A$ rotation speed
$\omega_B$ rotation speed
A previous gear
B following gear
$t_R$ filling time
$t_0$ instant
$t_1$ instant
$t_2$ instant
$t_3$ instant
$t_4$ instant
$T_E$ torque
$T_M$ torque
$T_{add}$ additional torque profile
$T_{addMAX}$ maximum value
$T_{addmin}$ minimum value
W start segment
X end segment

The invention claimed is:

1. A control method to carry out a gear shift in a transmission (6) provided with a dual-clutch gearbox (7) and in a road vehicle (1) comprising an internal combustion engine (4) and at least one reversible electric machine (11); the dual-clutch gearbox (7) has two primary shafts (12), at least one secondary shaft (14) connected to drive wheels (3), and two clutches (13), each of which is interposed between a drive shaft (5) of the engine (4) and a corresponding primary shaft (12); the control method comprises the steps of:
receiving a gear-shift command from a current gear (A) to a following gear (B);
opening a first clutch (13A) associated with the current gear (A) and simultaneously closing a second clutch (13B) associated with the following gear (B);
controlling, only and exclusively during the gear shift, the electric machine (11) to generate an additional torque profile ($T_{add}$) which is impulsive and comprises a start segment (W) having a first sign and an end segment (X), which immediately follows the start segment (W) and has a second sign, which is contrary to the first sign;
wherein if the gear shift is up the start segment (W) entails for an always positive torque and the final segment (X) entails an always negative torque, and if the gear shift is down the start segment (W) entails an always negative torque and the end segment (X) entails an always positive torque.

2. The control method according to claim 1, wherein each segment (W, X) entails a torque increase, in absolute value, from zero to a maximum value ($T_{addMAX}$, $T_{addmin}$) and a following torque decrease from the maximum value ($T_{addMAX}$, $T_{addmin}$) to zero.

3. The control method according to claim 1, wherein each segment (W, X) comprises at least one linear variation over time and at least one exponential variation over time.

4. The control method according to claim 1, wherein if the gear shift is up:
the start segment (W) entails an exponential torque increase from zero to a maximum positive value ($T_{addMAX}$) immediately followed by a linear torque decrease from the maximum positive value ($T_{addMAX}$) to zero; and
the end segment (X) entails a linear torque decrease from zero to a minimum negative value ($T_{addmin}$) immediately followed by an exponential increase from the minimum negative value ($T_{addmin}$) to zero.

5. The control method according to claim 4, wherein the linear torque decreases from zero to the minimum negative value ($T_{addmin}$) entails a greater start slope followed by a smaller end slope.

6. The control method according to claim 4, wherein the maximum value ($T_{addMAX}$) is, in absolute value, greater than the minimum value ($T_{addmin}$).

7. The control method according to claim 1, wherein if the gear shift is down:
the start segment (W) entails an exponential torque decrease from zero to a minimum negative value ($T_{addmin}$) immediately followed by a linear torque increase from the minimum negative value ($T_{addmin}$) to zero; and
the end segment (X) entails a torque increase from zero to a maximum positive value ($T_{addMAX}$) immediately followed by an exponential decrease from the maximum positive value ($T_{addMAX}$) to zero.

8. The control method according to claim 7, wherein the linear torque increase from zero to the maximum positive value ($T_{addMAX}$) entails a linear increase immediately followed by an exponential increase.

9. The control method according to claim 7, wherein the maximum value ($T_{addMAX}$) is, in absolute value, smaller than the minimum value ($T_{addmin}$).

10. The control method according to claim 1, wherein the torque objective ($T_M$) is positive, when an accelerator pedal (7) is at least partially pressed, and is negative, when the accelerator pedal (7) is released.

11. The control method according to claim 1 and comprising the steps of:
opening the first clutch (13A) associated with the current gear (A) and closing the second clutch (13B) associated with the following gear (B) in a same first instant ($t_1$); and
completing the opening of the first clutch (13A) associated with the current gear (A) and completing the closing of the second clutch (13B) associated with the following gear (B) in a same second instant ($t_2$) following the first instant ($t_1$).

12. The control method according to claim 11 and comprising the steps of:
generating a gear-shift command at a third instant ($t_0$) prior to the first instant ($t_1$); and
starting the additional torque profile ($T_{add}$) at the third instant ($t_0$).

13. The control method according to claim 12, wherein a maximum, in absolute value, of the additional torque profile ($T_{add}$) during the start segment (W) is reached between the third instant ($t_0$) and the first instant ($t_1$).

14. The control method according to claim 11, and comprising the steps of:
keeping the rotation speed ($\omega_E$) of the drive shaft (5) constant and equal to a start value ($\omega_A$) set by the gear ratio of the current gear (A) until the second instant ($T_2$), wherein the opening of the first clutch (13A) is completed;
varying progressively after the second instant ($t_2$) the rotation speed ($\omega_E$) of the engine shaft (5) from the initial value ($\omega_A$) imposed by the gear ratio of the current gear (A) to a final value ($\omega_B$) imposed by the gear ratio of the following gear (B) until a fourth instant ($t_3$) following the second instant ($t_2$) at which the synchronisation of the speed ($\omega_E$) of rotation of the engine shaft (5) is completed; and
terminating the additional torque profile ($T_{add}$) at the fourth instant ($t_3$).

15. The control method according to claim 11, wherein the start segment (W) ends, and then the end segment (X) starts between the first instant ($t_1$) and the second instant ($t_2$).

16. The control method according to claim 11, wherein a maximum, in absolute value, of the additional torque profile ($T_{add}$) during the end segment (X) is reached at the second instant ($t_2$).

17. The control method according to claim 1 and comprising the steps of:
determining a torque objective ($T_M$) to be generated by the electric machine (11) irrespective of the gear shift;
controlling the electric machine (11) so as to pursue the torque objective ($T_M$); and
adding, only and exclusively during the gear shift, to the torque objective ($T_M$), the additional torque profile ($T_{add}$), which is impulsive and temporarily changes the development of the torque objective ($T_M$).

* * * * *